US009832774B2

United States Patent
Wu

(10) Patent No.: US 9,832,774 B2
(45) Date of Patent: Nov. 28, 2017

(54) DEVICE OF HANDLING TRANSMISSION ON UNLICENSED COMPONENT CARRIER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 85 days.

(21) Appl. No.: 14/924,731

(22) Filed: Oct. 28, 2015

(65) Prior Publication Data

US 2016/0119928 A1 Apr. 28, 2016

Related U.S. Application Data

(60) Provisional application No. 62/069,334, filed on Oct. 28, 2014.

(51) Int. Cl.

| H04W 72/04 | (2009.01) |
| H04W 16/04 | (2009.01) |
| H04W 24/10 | (2009.01) |
| H04L 5/00 | (2006.01) |
| H04L 27/26 | (2006.01) |
| H04W 16/14 | (2009.01) |

(Continued)

(52) U.S. Cl.
CPC ......... *H04W 72/0453* (2013.01); *H04L 5/001* (2013.01); *H04L 5/0048* (2013.01); *H04L 5/0053* (2013.01); *H04L 27/0006* (2013.01); *H04L 27/2601* (2013.01); *H04W 16/14* (2013.01); *H04W 24/10* (2013.01); *H04W 88/08* (2013.01)

(58) Field of Classification Search
CPC .. H04W 16/14; H04W 24/10; H04W 72/0453
See application file for complete search history.

(56) References Cited

U.S. PATENT DOCUMENTS

| 2013/0039202 A1* | 2/2013 | Feuersanger ........... H04L 5/001 |
| | | 370/252 |
| 2013/0163447 A1 | 6/2013 | Koskela |

(Continued)

OTHER PUBLICATIONS

3GPP TS 36.300 V12.3.0 (Sep. 2014) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).

(Continued)

*Primary Examiner* — Ashley Shivers
(74) *Attorney, Agent, or Firm* — Winston Hsu

(57) ABSTRACT

A communication device for handling a signal transmission on an unlicensed component carrier (CC) comprises a storage unit for storing instructions and a processing means coupled to the storage unit. The processing means is configured to execute the instructions stored in the storage unit. The instructions comprise detecting at least one first signal transmitted by at least one base station on an unlicensed CC; determining at least one first time interval where the at least one first signal is transmitted by the at least one base station; and transmitting at least one second signal on the unlicensed CC in at least one second time interval to a communication device wherein the at least one second time interval is not overlapped with the at least one first time interval.

10 Claims, 6 Drawing Sheets

(51) Int. Cl.
*H04L 27/00* (2006.01)
*H04W 88/08* (2009.01)

(56) References Cited

U.S. PATENT DOCUMENTS

| | | | | |
|---|---|---|---|---|
| 2016/0007350 A1* | 1/2016 | Xiong | ............... | H04W 24/10 370/252 |
| 2016/0095048 A1* | 3/2016 | Nory | ............... | H04W 24/08 370/252 |
| 2016/0119846 A1* | 4/2016 | Chou | ............... | H04W 36/22 370/331 |
| 2016/0249350 A1* | 8/2016 | Koutsimanis | ......... | H04W 16/14 |

OTHER PUBLICATIONS

3GPP TS 36.331 V12.3.0 (Sep. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).
Draft ETSI EN 301 893 V1.7.2 (Jul. 2014) Broadband Radio Access Networks (BRAN); 5 GHz high performance RLAN; Harmonized EN covering the essential requirements of article 3.2 of the R&TTE Directive.
3GPP TS 36.213 V12.3.0 (Sep. 2014) Technical Specification 3rd Generation Partnership Project; Technical Specification Group Radio Access Network; Evolved Universal Terrestrial Radio Access (E-UTRA); Physical layer procedures (Release 12).
European Search report dated Feb. 16, 2016 for EP application No. 15191826.5.
Fujitsu, "Candidate functionalities towards the fairness design target in LAA", 3GPP TSG RAN WG1 Meeting #78bis, R1-144333, Oct. 6-10, 2014, Ljubljana, Slovenia, XP050875586, pp. 1-5.
Zte, "Analysis of LAA candidate solutions for coexistence", 3GPP TSG RAN WG1 Meeting #78bis, R1-143828, Oct. 6-10, 2014, Ljubljana, Slovenia, XP050869510, pp. 1-5.
"Qualcomm Research LTE in Unlicensed Spectrum: Harmonious Coexistence with Wi-Fi", Qualcomm Technologies Inc., Jun. 2014, pp. 1-19, XP055183824, San Diego, CA, USA.
Hitachi Ltd., "Design targets for LAA using LTE", 3GPP TSG RAN WG1 Meeting #78bis, R1-144221, Oct. 6-10, 2014, Ljubljana, Slovenia, XP050875493, pp. 1-4.
Samsung, "Discussion on solutions for required functionalities and design targets for LAA", 3GPP TSG RAN WG1 #78bis, R1-143879, Oct. 6-10, 2014, Ljubljana, Slovenia, XP050875192, pp. 1-3.
Search Report dated Jun. 9, 2016 for EP application No. 15191826. 5, pp. 1-8.
Office action dated Jun. 22, 2016 for EP application No. 15191826. 5, pp. 1-10.
"Qualcomm Research LTE in Unlicensed Spectrum: Harmonious Coexistence with Wi-Fi", Qualcomm Technologies, Inc., Jun. 2014, XP055183824, pp. 1-19.

* cited by examiner

DEVICE OF HANDLING TRANSMISSION ON UNLICENSED COMPONENT CARRIER

CROSS REFERENCE TO RELATED APPLICATIONS

This application claims the benefit of U.S. Provisional Application No. 62/069,334, filed on Oct. 28, 2014 and incorporated herein by reference.

BACKGROUND OF THE INVENTION

1. Field of the Invention

The present invention relates to a communication device used in a wireless communication system, and more particularly, to a communication device of handling a signal transmission on an unlicensed component carrier in a wireless communication system.

2. Description of the Prior Art

A long-term evolution (LTE) system is developed by the 3rd Generation Partnership Project (3GPP) to satisfy increasing needs of users. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system is an evolution of the LTE system which improves performance at the coverage edge of an eNB, increases peak data rate and throughput by introducing advanced techniques, such as carrier aggregation (CA), coordinated multipoint (CoMP) transmissions/reception, uplink (UL) multiple-input multiple-output (UL-MIMO), licensed-assisted access (LAA) using LTE, etc.

Network operators propose to offload network traffic of the LTE/LTE-A system from a licensed band to an unlicensed band, to ease load of the network traffic. For example, the eNB may provide services to the UE via the unlicensed band.

For transmission in an unlicensed band, listen before talk (LBT) may be needed. To meet the requirement of the LBT, a first clear channel assessment (CCA) operation may be performed within a first time interval, before a transmission is performed. In detail, the eNB may suspend transmission on a downlink (DL) carrier in the unlicensed band for a first time interval to perform the first CCA operation on the DL carrier. In addition, the eNB may suspend transmission for a second time interval and perform a second CCA operation for the second time interval, when the result of the first CCA operation indicates that the DL carrier is busy (e.g., occupied). In this situation, the UE receives no data on the DL carrier during the first time interval and the second time interval. Thus, throughput of the UE is decreased due to the suspensions of the transmissions related to the CCA operation.

Thus, how to handle the transmissions on the carrier (i.e., unlicensed carrier) in the unlicensed band is an important problem to be solved.

SUMMARY OF THE INVENTION

The present invention therefore provides communication device for handling an unlicensed component carrier to solve the abovementioned problem.

A communication device for handling a signal transmission on an unlicensed component carrier (CC) comprises a storage unit for storing instructions and a processing means coupled to the storage unit. The processing means is configured to execute the instructions stored in the storage unit. The instructions comprise detecting at least one first signal transmitted by at least one base station on an unlicensed CC; determining at least one first time interval where the at least one first signal is transmitted by the at least one base station; and transmitting at least one second signal on the unlicensed CC in at least one second time interval to a communication device, wherein the at least one second time interval is not overlapped with the at least one first time interval.

A communication device for handling a signal transmission on an unlicensed component carrier (CC) comprises a storage unit for storing instructions and a processing means coupled to the storage unit. The processing means is configured to execute the instructions stored in the storage unit. The instructions comprise detecting at least one first signal transmitted on an unlicensed CC and/or first energy on the unlicensed CC; and transmitting at least one second signal on the unlicensed CC under a condition that the at least one first signal is not detected and/or a level of the first energy is lower than a first threshold value.

A communication device for handling a plurality of component carriers (CCs) comprises a storage unit for storing instructions and a processing means coupled to the storage unit. The processing means is configured to execute the instructions stored in the storage unit. The instructions comprise configuring a plurality of CCs and a first CC to a communication device, wherein the plurality of CCs are activated and the first CC is not activated; configuring the communication device to perform at least one first channel measurement on the first CC; receiving at least one first channel information obtained based on the at least one first channel measurement from the communication device; and transmitting a first command for activating the first CC to the communication device according to the at least one first channel information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
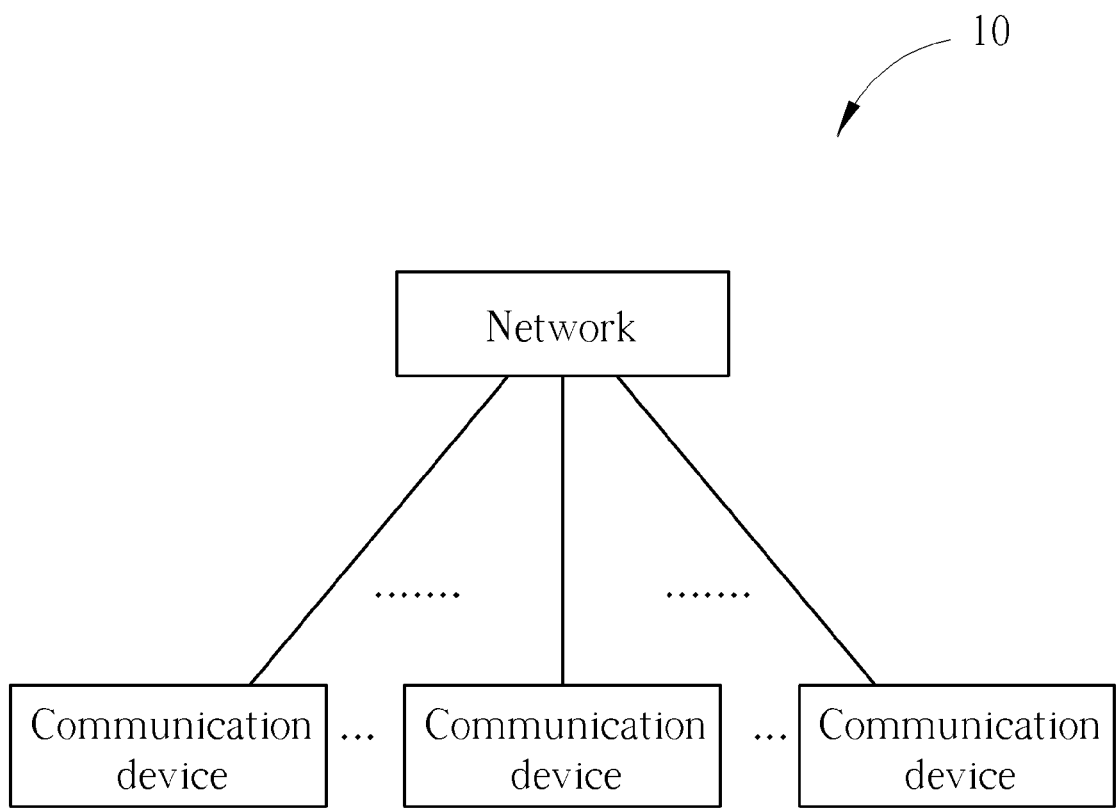
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (e.g., primary component carrier (CC)) and one or more secondary cells (e.g., secondary component carriers). The abovementioned cells may be operated in the same or different duplexing modes, i.e. frequency-division duplexing (FDD) and time-division duplexing (TDD). For example, the primary cell may be operated on licensed carrier(s), while the secondary cell may be operated on unlicensed carrier(s).

In FIG. 1, the network and the communication devices are simply utilized for illustrating the structure of the wireless communication system 10. Practically, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. The eNB or the relay may be termed as a base station.

A communication device may be a user equipment (UE), a low cost device (e.g., machine type communication (MTC) device), a device-to-device (D2D) device, a mobile phone, a laptop, a tablet computer, an electronic book, a portable computer system, a vehicle, airplane or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
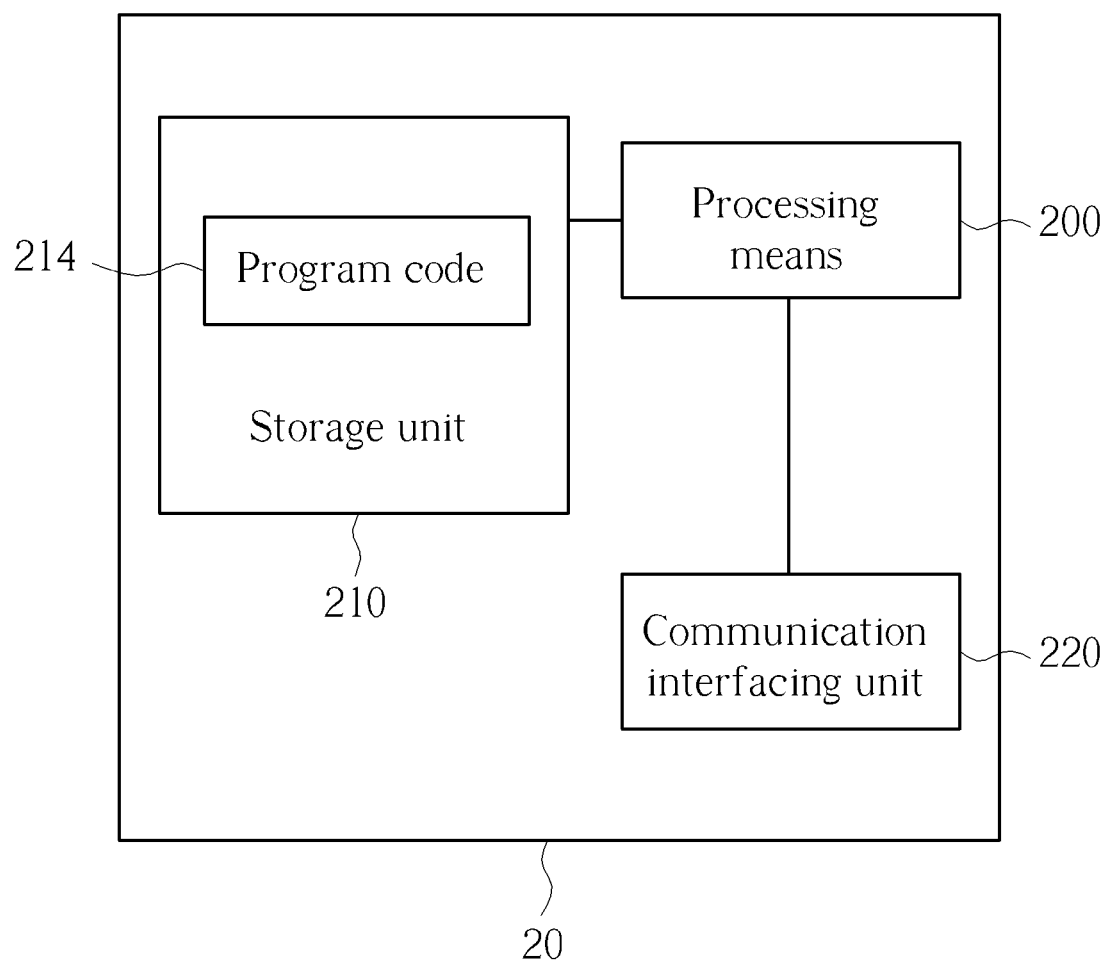
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200. For the sake of simplicity, UE is taken as an example of the communication device in the following embodiments. It should be noted that the scope of the invention is not limited thereto.

Figure 3:
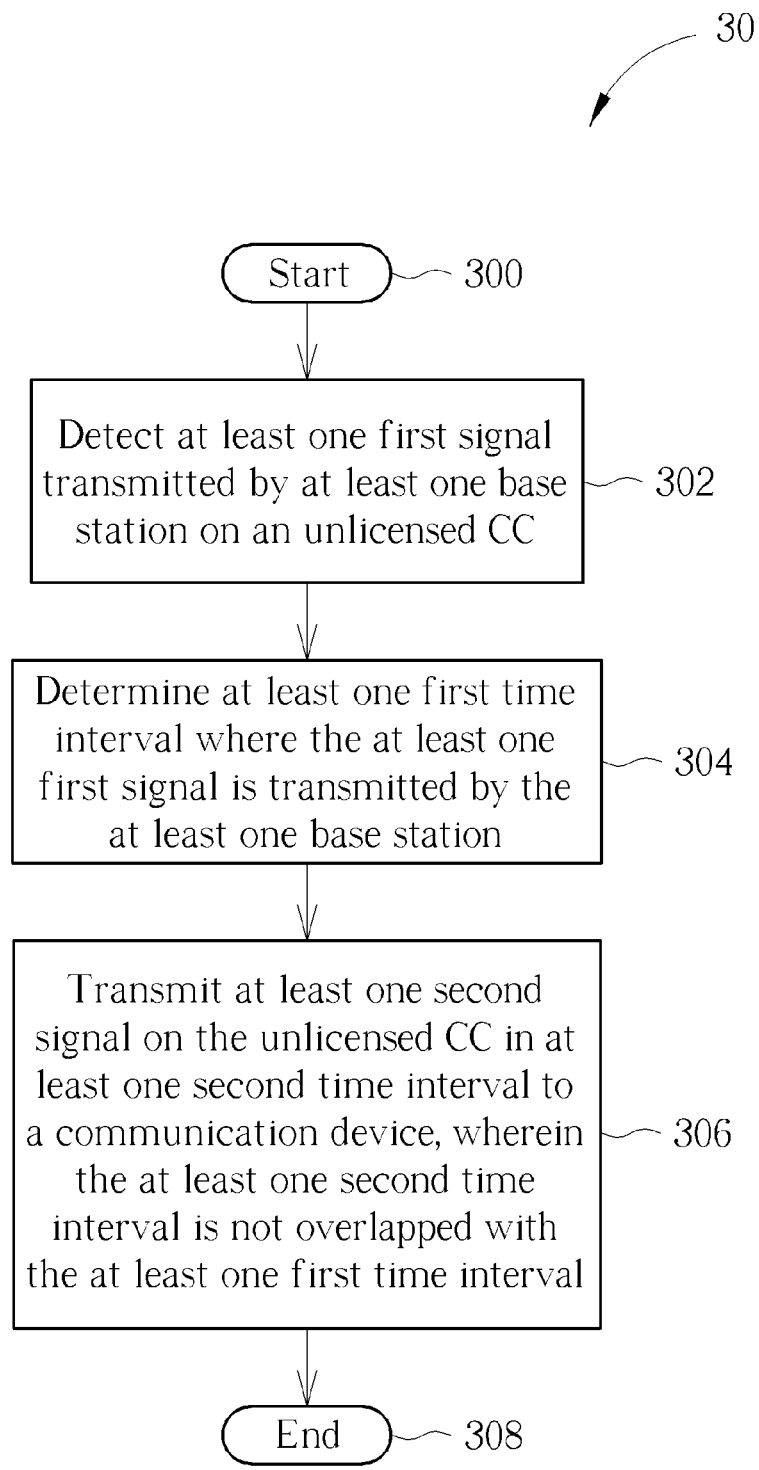
FIG. 3 is a flowchart of a process according to an example of the present invention.

FIG. 3 is a flowchart of a process 30 according to an example of the present invention. The process 30 may be utilized in a base station (e.g., eNB) in the network of FIG. 1, to handle a signal transmission on an unlicensed CC. The process 30 may be compiled into the program code 214 and includes the following steps:

Step 300: Start.

Step 302: Detect at least one first signal transmitted by at least one base station on an unlicensed CC.

Step 304: Determine at least one first time interval where the at least one first signal is transmitted by the at least one base station.

Step 306: Transmit at least one second signal on the unlicensed CC in at least one second time interval to a communication device, wherein the at least one second time interval is not overlapped with the at least one first time interval.

Step 308: End.

According to the process 30, the base station may detect at least one first signal (e.g., LTE signal) transmitted by at least one base station (e.g., eNB(s)) on an unlicensed CC. Then, the base station may determine at least one first time interval where the at least one first signal is transmitted by the at least one base station. The base station may transmit at least one second signal (e.g., LTE signal) on the unlicensed CC in at least one second time interval to a communication device (e.g., UE), wherein the at least one second time interval is not overlapped with the at least one first time interval. That is, the base station selects different time interval(s) for performing the transmission of the at least one second signal to avoid a collision with the transmission of the at least one first signal from the other base station(s). Thus, the interference caused to the base station and the other base station(s) can be mitigated or avoided. As a result, throughputs of the base station and the communication device can be improved.

Realization of the process 30 is not limited to the above description.

In one example, the base station in the process 30 may detect the at least one first signal by decoding the at least one first signal. That is, the at least one signal may be decoded to know content location of orthogonal frequency division multiplexing (OFDM) symbol(s), location of time slot(s), location of subframe(s), patterns and/or transmission intervals where the at least one first signal is transmitted, such that different time interval(s) may be determined. In one example, the base station may suspend at least one transmission on the unlicensed CC when detecting the at least one first signal. In one example, there may be a third time interval between the transmissions of the at least one first signal and the at least one second signal. The third time interval between the at least one first time interval and the second time interval may include a time duration of at least one OFDM symbol. In one example, the at least one first signal may include at least one of a primary synchronization signal (PSS), a secondary synchronization signal (SSS), a cell-specific reference signal (CRS), a channel state information (CSI) RS (CSI-RS), and a positioning RS for a positioning measurement. The at least one second signal may include at least one of a PSS, a SSS, a CRS, a CSI-RS, and a positioning RS for a positioning measurement, wherein the at least one second signal is different from the at least one first signal. For example, the first PSS is different from the second PSS.

Figure 4:
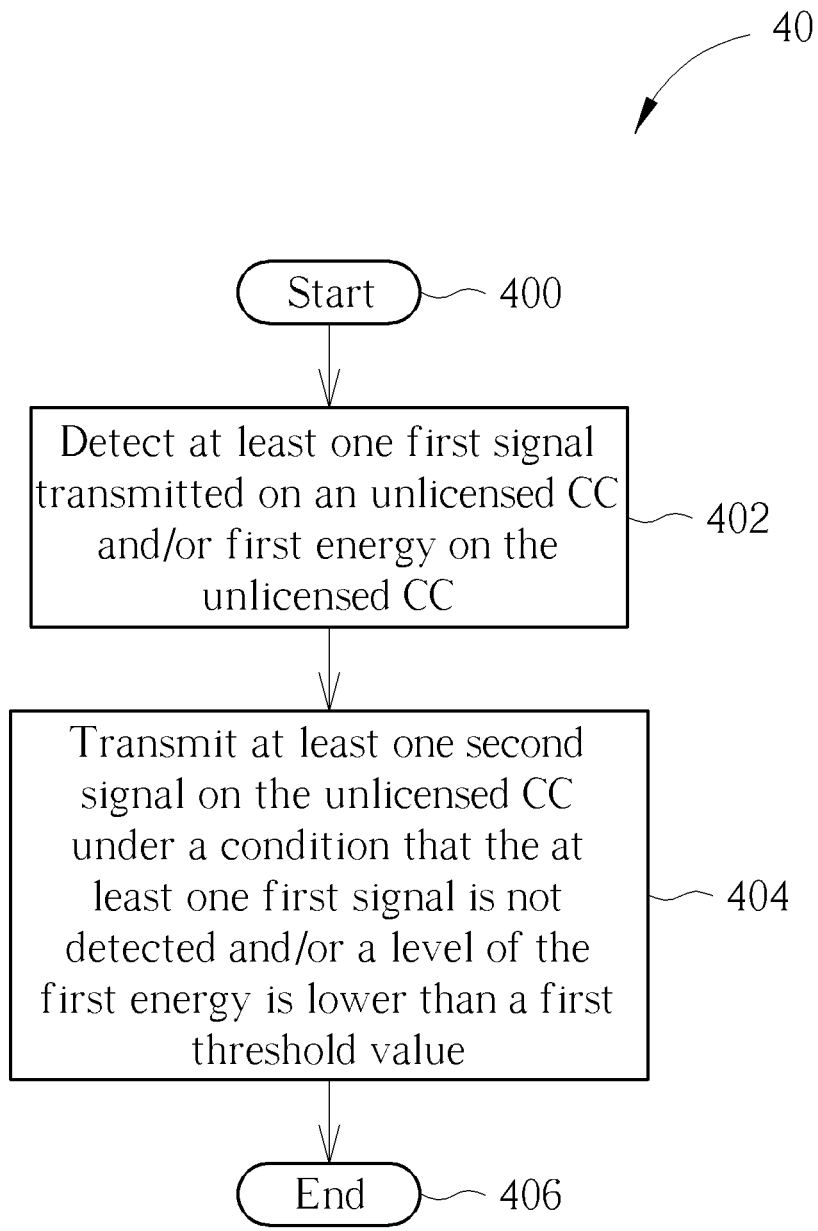
FIG. 4 is a flowchart of a process according to an example of the present invention.

FIG. 4 is a flowchart of a process 40 according to an example of the present invention. The process 40 may be utilized in a base station (e.g., eNB) in the network of FIG. 1, to handle a signal transmission on an unlicensed CC. The process 40 may be compiled into the program code 214 and includes the following steps:

Step 400: Start.

Step 402: Detect at least one first signal transmitted on an unlicensed CC and/or first energy on the unlicensed CC.

Step 404: Transmit at least one second signal on the unlicensed CC under a condition that the at least one first signal is not detected and/or a level of the first energy is lower than a first threshold value.

Step 406: End.

According to the process 40, the base station may detect at least one first signal transmitted on an unlicensed CC (e.g., by at least one base station) and/or first energy on the unlicensed CC. Then, the base station may transmit at least one second signal on the unlicensed CC (e.g., to a communication device (e.g., UE)) under a condition that the at least one first signal is not detected and/or a level of the first energy is lower than a first threshold value. For example, the base station may transmit a first signal on the unlicensed CC, if a second signal is not detected on the unlicensed CC. In another example, the base station may transmit a first signal on the unlicensed CC, if a level of energy detected on the unlicensed CC is lower than a threshold value. In another example, the base station may transmit a first signal on the unlicensed CC, if both of the above conditions are satisfied. Thus, the interference caused to the base station can be mitigated or avoided.

Realization of the process 40 is not limited to the above description.

In one example, the base station in the process 40 may transmit the at least one second signal on another unlicensed CC to the communication device under a condition that the at least one first signal is detected and/or the level of the first energy is greater than a second threshold value. That is, the base station may select another unlicensed CC for performing the transmission of the at least one second signal, under a condition that one or two of the above conditions are satisfied or under a condition that at least one third signal transmitted on the other unlicensed CC is not detected and/or a level of second energy on the other unlicensed CC is lower than a second threshold value. In one example, the base station may suspend at least one transmission on the unlicensed CC under a condition that the at least one first signal is detected and/or the level of the first energy is greater than a second threshold value. In one example, the at least one first signal and/or the at least one third signal may include at least one of a PSS, a SSS, a CRS, a CSI-RS, and a positioning RS for a positioning measurement. In one example, the at least one second signal may include at least one of a PSS, a SSS, a CRS, a CSI-RS, and a positioning RS for a positioning measurement, a physical DL control channel (PDCCH) and a physical DL shared channel (PDSCH).

Figure 5:
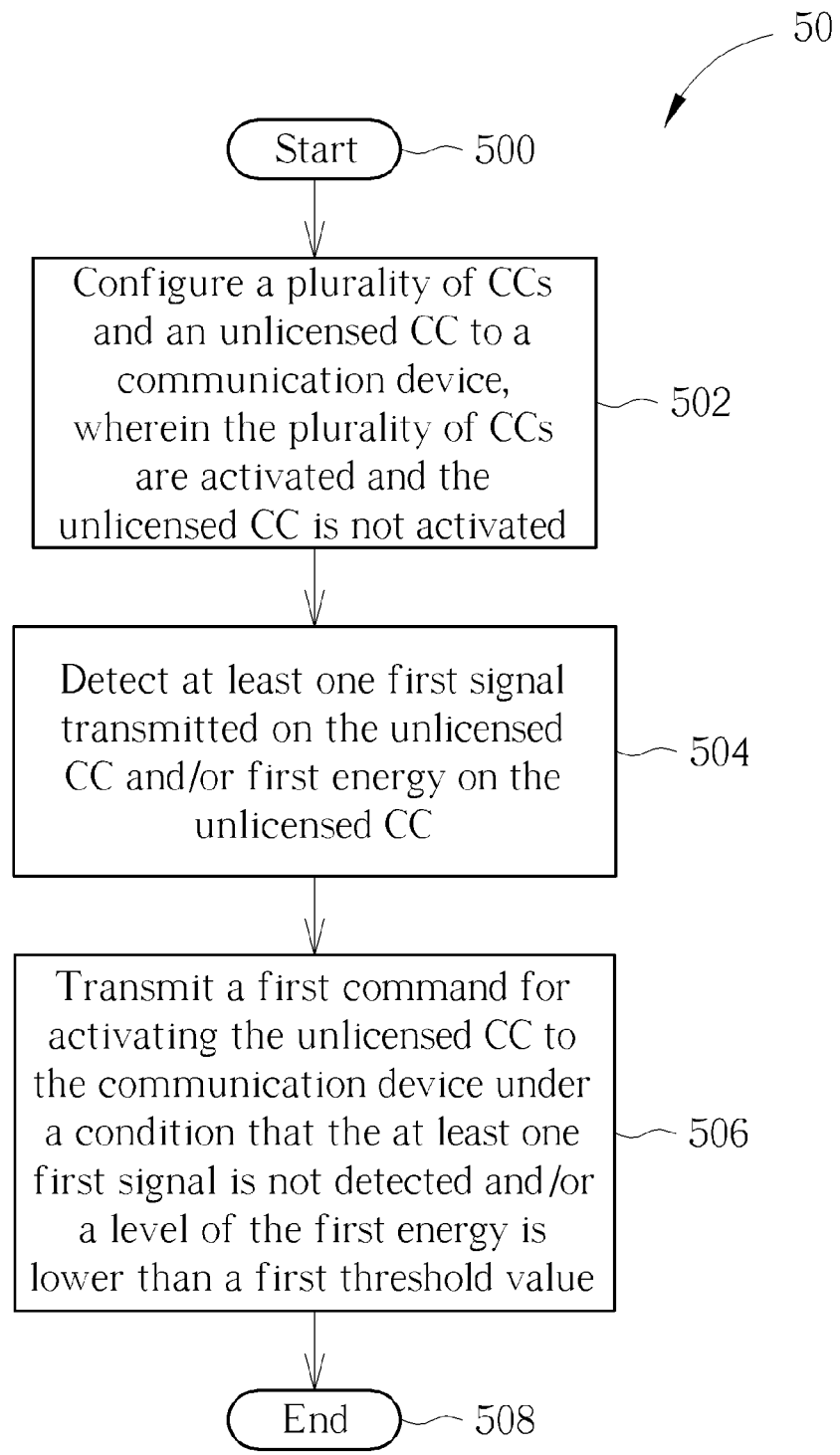
FIG. 5 is a flowchart of a process according to an example of the present invention.

FIG. 5 is a flowchart of a process 50 according to an example of the present invention. The process 50 may be utilized in a base station (e.g., eNB) in the network of FIG. 1, to handle a signal transmission on an unlicensed CC. The process 50 may be compiled into the program code 214 and includes the following steps:

Step 500: Start.

Step 502: Configure a plurality of CCs and an unlicensed CC to a communication device, wherein the plurality of CCs are activated and the unlicensed CC is not activated.

Step 504: Detect at least one first signal transmitted on the unlicensed CC and/or first energy on the unlicensed CC.

Step 506: Transmit a first command for activating the unlicensed CC to the communication device under a condition that the at least one first signal is not detected and/or a level of the first energy is lower than a first threshold value.

Step 508: End.

According to the process 50, the base station may configure a plurality of CCs and an unlicensed CC to a communication device (e.g., UE), wherein the plurality of CCs are activated and the unlicensed CC is not activated. Similar to the process 40, the base station may detect at least one first signal transmitted on the unlicensed CC (e.g., by at least one base station) and/or first energy on the unlicensed CC. Then, the base station may transmit a first command for activating the unlicensed CC to the communication device under a condition that the at least one first signal is not detected and/or a level of the first energy is lower than a first threshold value. For example, the base station may transmit the first command for activating the unlicensed CC, if a signal is not detected on the unlicensed CC. In another example, the base station may transmit the first command for activating the unlicensed CC, if a level of energy detected on the unlicensed CC is lower than a threshold value. In another example, the base station may transmit the first command for activating the unlicensed CC, if both of the above conditions are satisfied. Thus, the interference caused to the base station can be mitigated or avoided.

Realization of the process 50 is not limited to the above description.

In one example, the base station in the process 50 may transmit a second command for deactivating a CC of the plurality of CCs to the communication device under a condition that at least one second signal on the CC is not detected and/or a level of second energy on the CC is lower than a second threshold value. Note that the first command and the second command may be different commands or may be transmitted as a single command, and is not limited herein. In other words, the base station may also detect signal(s) transmitted by other base station(s) on an activated CC and/or detect energy on the activated CC. The base station may transmit a command for deactivating the activated CC to a communication device, when one or two of the above conditions are satisfied.

It should be noted that although the examples are illustrated based on the processes 40 and/or 50, to clarify the operations of the base station. The examples can be combined and/or modified arbitrarily according to system requirements and/or design considerations.

Figure 6:
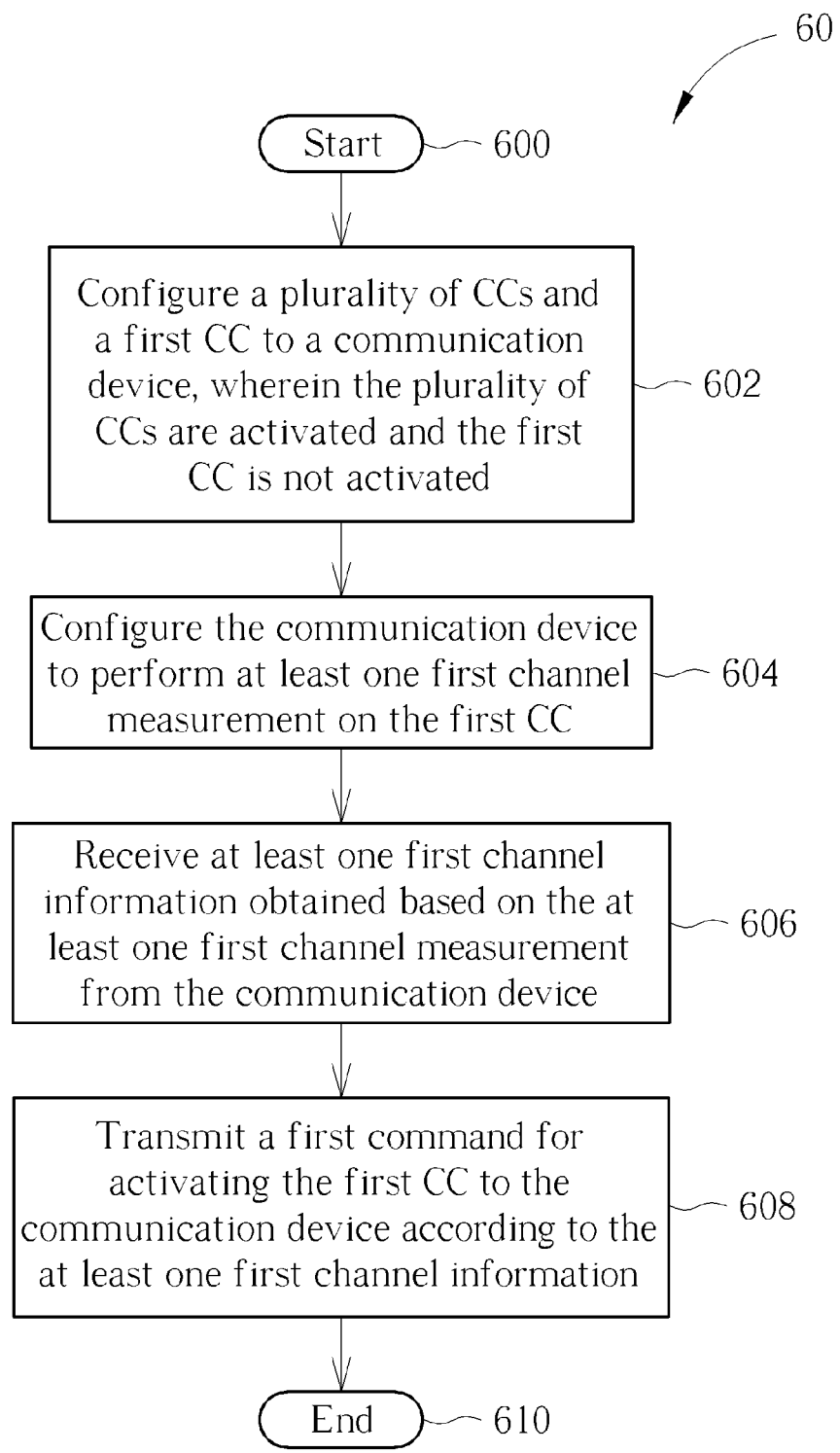
FIG. 6 is a flowchart of a process according to an example of the present invention.

FIG. 6 is a flowchart of a process 60 according to an example of the present invention. The process 60 may be utilized in a base station (e.g., eNB) in the network of FIG. 1, to handle a signal transmission on an unlicensed CC. The process 60 may be compiled into the program code 214 and includes the following steps:

Step 600: Start.

Step 602: Configure a plurality of CCs and a first CC to a communication device, wherein the plurality of CCs are activated and the first CC is not activated.

Step 604: Configure the communication device to perform at least one first channel measurement on the first CC.

Step 606: Receive at least one first channel information obtained based on the at least one first channel measurement from the communication device.

Step 608: Transmit a first command for activating the first CC to the communication device according to the at least one first channel information.

Step 610: End.

According to the process 60, the base station may configure a plurality of CCs and a first CC to a communication device (e.g., UE), wherein the plurality of CCs are activated and the first CC is not activated. The base station may further configure the communication device to perform at least one first channel measurement (e.g., CSI measurement(s)) on the first CC. Then, the base station may receive at least one first channel information (e.g., CSI) obtained based on the at least one first channel measurement from the communication device. Accordingly, the base station may transmit a first command for activating the first CC to the communication device according to the at least one first channel information. That is, the base station may activate a deactivated CC based on one or more channel information(s) from the communication device, after the deactivated CC is configured to the communication device. Thus, the activation of the CC can be performed instantly, because the channel information(s) is usually reported frequently. As a result, resource allocation can be performed flexibly to improve throughputs of the base station and the communication device.

Realization of the process 60 is not limited to the above description.

In one example, the base station in the process 60 may configure the communication device to perform at least one second channel measurement on a second CC of the plurality of CCs. Then, the base station may receive at least one second channel information (e.g., CSI(s)) obtained based on the at least one second channel measurement from the communication device, and may transmit a second command for deactivating the second CC to the communication device according to the at least one second channel information. That is, channel information(s) not only can be used for activating a CC, but also can be used for deactivating a CC. Note that the first command and the second command may be different commands or may be transmitted as a single command, and is not limited herein. In one example, the first CC and the second CC may be unlicensed CCs. In one example, a number of the plurality of CCs may be related to a maximum number of CCs supported by the communication device. For example, the number of the plurality of CCs may be less than equal to the maximum number of CCs. In one example, the base station may further configure measurement gap(s) to the communication device, for the communication device to perform the at least one first channel measurement according to the measurement gap(s).

Examples for realizing the process 60 are further illustrated as follows.

The first command in the process 60 may be an activation medium access control (MAC) control element or a PDCCH signaling (e.g., a PDCCH DL control information (DCI) with a cyclic redundancy check (CRC) scrambled by a new Radio Network Temporary Identifier (RNTI)) for an activation of a CC or a serving cell (e.g., secondary cell). Similarly, the second command mentioned above may be a deactivation MAC control element or a PDCCH signaling (e.g., a PDCCH DCI with a CRC scrambled by a new RNTI) for a deactivation of a CC or a serving cell (e.g., secondary cell). Comparing with the MAC control element, the PDCCH signaling is in general a faster signaling for activating/deactivating a CC.

A base station (e.g., eNB) may transmit a CSI-RS resource configuration, a CSI interference measurement (CSI-IM) resource configuration, or a new reference signal configuration to a communication device (e.g., UE), e.g., in a radio resource control (RRC) message (e.g., RRCConnectionReconfiguration) for the communication device to perform CSI measurement(s). The new reference signal configuration may include time resource(s) and/or frequency resource(s) that can be used by the communication device to report CSI(s), and the new reference signal configuration may be designed specifically for an unlicensed CC. The communication device may perform the CSI measurement(s) on the unlicensed CC according to a CSI-RS resource, a CSI-IM resource or a new reference signal resource which is determined based on the CSI-RS resource configuration, the CSI-IM resource configuration, or the new reference signal configuration, respectively. The communication device may obtain CSI(s) (e.g., channel quality indicator(s) (CQI(s))) for the unlicensed CC according to the CSI measurement(s), and may transmit the CSI(s) to the base station. In other words, the communication device may measure a CSI-RS, a CSI-IM RS or a new reference signal on the unlicensed CC to derive the CSI(s), and may transmit the CSI(s) on a physical UL control channel (PUCCH) on a CC (e.g., licensed CC) of the plurality of CCs to the base station.

The base station may determine to activate the unlicensed CC, if the CSI(s) indicates that the unlicensed CC is good for performing a transmission. For example, each, average, or mathematic operation of consecutive CQIs is greater than a predetermined value. The communication device may have at least one CSI process associated with the CSI-RS resource, the CSI-IM resource or the new reference signal resource. If the base station does not transmit these resource configurations, the communication device may perform the CSI measurement(s) based on a CRS which is derived from a physical cell identity by the communication device.

The base station may transmit at least two RRC messages to configure the plurality of CCs and the unlicensed CC to the communication device. For example, the base station may transmit a first RRC message (e.g., RRCConnectionSetup) to establish a connection with the communication device on a first CC and a second CC of the plurality of CCs. For a FDD mode, the first CC and the second CC are licensed CCs. For a TDD mode, the first CC and the second CC are the same CC. The base station may transmit a second RRC message (e.g., RRCConnectionReconfiguration) on a first CC to configure a third CC of the plurality of CCs and a fourth CC to the communication device, wherein the third CC and the fourth CC are deactivated and are unlicensed CCs. The base station may transmit a command to activate the third CC. The second RRC message may further include a CSI-RS resource configuration, a CSI-IM resource configuration, or a new reference signal configuration for the fourth CC and/or a CSI-RS resource configuration, a CSI-IM resource configuration, or a new reference signal configuration for the third CC.

According to the prior art, a communication device does not transmit CSI(s) on a PUCCH for a deactivated CC. According to present invention, the communication device transmits the CSI(s) on the PUCCH for the deactivated CC. Comparing with a RRC signaling for reporting a reference signal received power (RSRP) and/or a reference signal received quality (RSRQ) measured on a deactivated CC according to the prior art, it is much more efficient to report the CSI(s) on the PUCCH since the CSI(s) reported on the PUCCH belongs to a physical layer signaling. In addition, according to the prior art, more processing procedures are needed for a RRC message including the RSRP/RSRQ, e.g., encrypting and constructing MAC/radio link control (RLC)/packet data convergence protocol (PDCP) packet data units (PDUs) which include headers. The base station is unable to quickly decide whether to activate a deactivated CC or to deactivate an activated CC for the communication device.

It should be noted that although the examples are illustrated based on the process 60, to clarify the operations of the base station. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a base station communicating with a communication device for solving collision between base station(s). The interference caused to the base station can be mitigated or avoided. As a result, throughputs of the base station and the communication device can be improved. The present invention also provides a method for activating component carriers instantly. Thus, resource allocation can be performed flexibly to improve throughputs of the base station and the communication device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station for handling a signal transmission on an unlicensed component carrier (CC), comprising:
a storage unit for storing instructions of:
decoding at least one first signal transmitted by at least one other base station on an unlicensed CC;
determining, from the at least one first signal, at least one first time interval where the at least one first signal is transmitted by the at least one other base station; and
transmitting at least one second signal on the unlicensed CC in at least one second time interval to a communication device, wherein the at least one second time interval is not overlapped with the at least one first time interval; and
a processing means, coupled to the storage unit, configured to execute the instructions stored in the storage unit;
wherein the at least one first signal comprises at least one of a primary synchronization signal (PSS), a secondary synchronization signal (SSS), a cell-specific reference signal (CRS), a channel state information (CSI) RS (CSI-RS), and a positioning RS for a positioning measurement;
wherein the at least one second signal comprises at least one of the PSS, the SSS, the CRS, the CSI-RS, and the positioning RS for a positioning measurement, wherein the at least one second signal is different from the at least one first signal.

2. The base station of claim 1, wherein the base station suspends at least one transmission on the unlicensed CC when decoding the at least one first signal.

3. The base station of claim 1, wherein a third time interval between the at least one first time interval and the at least one second time interval comprises a time duration of at least one orthogonal frequency division multiplexing (OFDM) symbol.

4. A base station for handling a signal transmission on an unlicensed component carrier (CC), comprising:
a storage unit for storing instructions of:
detecting at least one first signal transmitted on an unlicensed CC and/or first energy on the unlicensed CC;
transmitting at least one second signal on the unlicensed CC under a condition that the at least one first signal is not detected and/or a level of the first energy is lower than a first threshold value; and
transmitting the at least one second signal on another unlicensed CC under a condition that the at least one first signal is detected and/or the level of the first energy is greater than a second threshold value; and
a processing means, coupled to the storage unit, configured to execute the instructions stored in the storage unit.

5. The base station of claim 4, wherein the base station suspends at least one transmission on the unlicensed CC under a condition that the at least one first signal is detected and/or the level of the first energy is greater than a second threshold value.

6. The base station of claim 4, wherein the at least one first signal comprises at least one of a primary synchronization signal (PSS), a secondary synchronization signal (SSS), a cell-specific reference signal (CRS), a channel state information (CSI) RS (CSI-RS), and a positioning RS for a positioning measurement.

7. The base station of claim 4, wherein the at least one second signal comprises at least one of a PSS, a SSS, a CRS, a CSI-RS, and a positioning RS for a positioning measurement, a physical downlink (DL) control channel (PDCCH) and a physical DL shared channel (PDSCH).

8. The base station of claim 4, wherein the storage unit further stores the instructions of:
configuring a plurality of CCs and the unlicensed CC to a communication device, wherein the plurality of CCs are activated and the unlicensed CC is not activated; and
transmitting a first command for activating the unlicensed CC to the communication device under a condition that the at least one first signal is not detected and/or the level of the first energy is lower than the first threshold value.

9. The base station of claim 8, wherein the storage unit further stores the instruction of:
transmitting a second command for deactivating a CC of the plurality of CCs to the communication device under a condition that at least one third signal on the CC is not detected and/or a level of second energy on the CC is lower than a third threshold value.

10. A base station for handling a plurality of component carriers (CCs), comprising:
a storage unit for storing instructions of:
configuring a plurality of CCs and an unlicensed CC to a communication device, wherein the plurality of CCs are activated and the unlicensed CC is not activated;
transmitting a first command for activating the unlicensed CC to the communication device under a first condition that at least one first signal is not detected and/or a level of first energy on the unlicensed CC is lower than a first threshold value; and
transmitting a second command for deactivating a CC of the plurality of CCs to the communication device under a second condition that at least one second signal on the CC is not detected and/or a level of second energy on the CC is lower than a second threshold value; and
a processing means, coupled to the storage unit, configured to execute the instructions stored in the storage unit.

* * * * *